Jan. 21, 1936.  C. L. EKSERGIAN  2,028,536
WHEEL RIM
Filed July 9, 1932   2 Sheets-Sheet 1
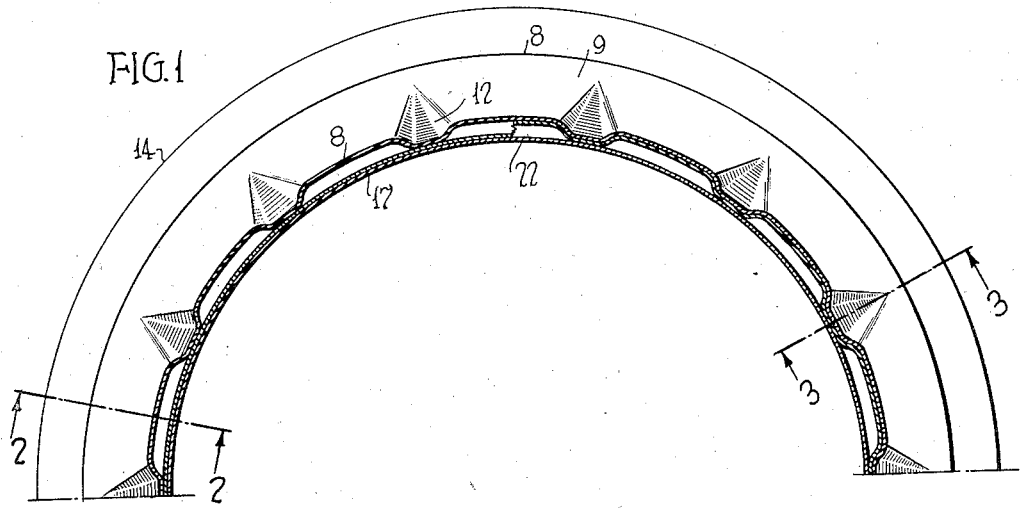
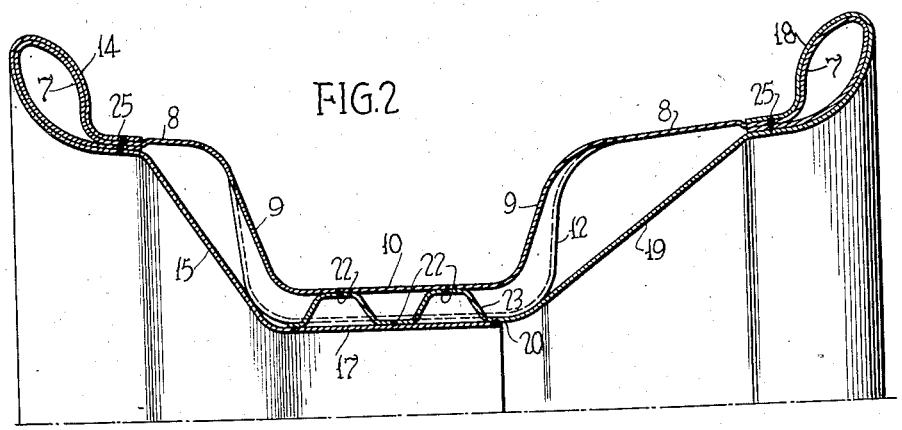
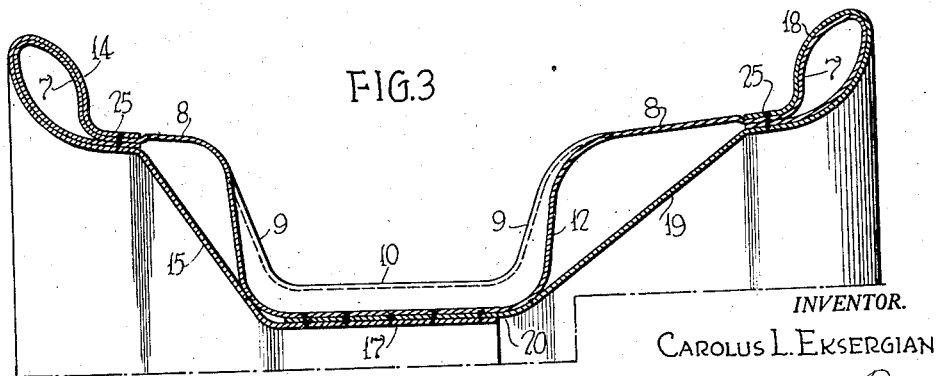
INVENTOR.
CAROLUS L. EKSERGIAN.
BY
ATTORNEY.

Jan. 21, 1936.  C. L. EKSERGIAN  2,028,536

WHEEL RIM

Filed July 9, 1932  2 Sheets-Sheet 2

INVENTOR.
Carolus L. Eksergian.
BY
John P. Tarbox
ATTORNEY.

Patented Jan. 21, 1936

2,028,536

UNITED STATES PATENT OFFICE 2,028,536

WHEEL RIM

Carolus L. Eksergian, Detroit, Mich., assignor to Budd Wheel Company, Philadelphia, Pa., a corporation of Pennsylvania Application July 9, 1932, Serial No. 621,539

14 Claims. (Cl. 152—20)

My invention relates to wheel rims and particularly to rims for vehicle wheels.

One object of my invention is to provide a wheel rim that shall be of light weight and great strength.

Another object of my invention is to facilitate certain shaping and welding operations attending the fabrication of vehicle wheels of a particular type.

Another object of my invention is to provide a wheel rim that shall be constructed substantially entirely of thin-gauge sheet metal in the form of a hollow shell shaped or reinforced by truss, hollow section, laminated and other formations to render it of great strength.

Another object of my invention is to provide a novel perimetrically extending interlock between portions of a wheel rim.

A further object of my invention is to provide a wheel rim that shall be simple and durable in construction, economical to manufacture and effective in its operation.

In one aspect, my invention comprises a wheel rim of hollow shell character having interior interbracing means for widely distributing the load stresses.

Another important feature resides in an arrangement of offset reinforcing and interlocking elements, either alone or in combination with the interbracing means.

Specifically, and in a particular embodiment, sheet-metal elements define the axial area, or contour, of a rim that is normally of comparable area but of solid section. These elements are preferably in the form of an endless axial-plane loop, either entirely spaced about the rim area or having intermediate engaging portions, whereby one or more perimetral portions of hollow section, joined by laminated sections, are formed.

Co-operating offset portions, on the component elements, provide axial and perimetral reinforcement, and are interlocked at spaced positions to prevent relative movement of the elements.

Laminated portions, box or tubular sections, channel sections or ribs and other features are combined to permit the structure to be constructed entirely of extremely thin-gauge sheet metal, to have great strength and to be of very light weight, in a manner not believed to have been heretofore attained in automobile or other heavy vehicle practice; there being a great distinction between practices in this field and the customs in connection with bicycles, handcarts, toys and other wheeled objects.

By the employment of such thin sheet-metal, the fabrication processes are facilitated considerably over those attending the shaping of heavy-gauge sheet metal, material is conserved, handling is made easier, shipping charges are reduced and other advantages, such as the reduction in weight of the vehicle and the easier replacement of tires, are obtained.

Additionally, as to axially and/or radially and/or annularly extending corrugations, transversely thereof tie members are provided which are arranged so as to prevent any spreading of the corrugations, to stiffen the walls against bending and torque loads, as well as against lateral impact loads.

Figure 1 of the accompanying drawings is a side view partially in wheel-plane section and partially in elevation, of one-half of a rim embodying my invention.

Figure 2 is an enlarged axial section of the rim, taken along the line 2—2 of Figure 1.

Figure 3 is a view, similar to Figure 2, taken along the line 3—3 of Figure 1.

Figure 4:
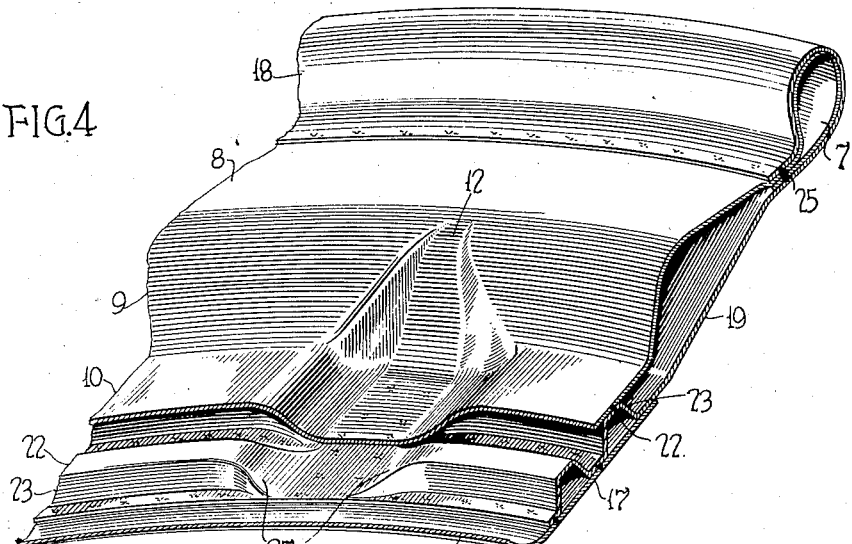
Figure 4 is a detail perspective view of a portion of the rim shown in the previous figures.

Referring to Figures 1 to 4, inclusive, in this form of the invention, the rim is preferably constructed as a composite structure having three major component elements or annuli of thin-gauge sheet metal.

One of these major component elements is a central, or radially-outer, annulus having return-bent axial side margins 7 of box or tubular section, tire-base portions 8 and a drop-center portion, including side walls 9 and a bottom wall 10. Annularly-spaced, axially-extending offset portions 12, of channel section are formed in the walls 9 and 10, in embracing relation to the drop-center channel formed thereby, between positions, adjacent to the intersections of the walls 8 and 9, at each side of the bottom 10. By axially extending in describing the protruding or offset portions 12 is meant that they extend crosswise of the rim as contrasted to circumferentially or perimetrically.

Another of the above-mentioned component elements is an axial end, or wheel-plane side, annulus, at the left-hand side, as viewed in Figures 2 and 3, having a return-bent marginal portion 14, covering the adjacent flange 7, a side wall 15 and a bottom wall 17. This element therefore extends axially, from a radially-outer position on the radially-outer component annulus, to a position beyond the center of the wall 10.

The third component element is similar to the second, except that, in addition to a return-bent marginal portion 18, covering the opposite flange 7, and a side wall 19, it has a bottom wall 20 having radially offset portions of substantially-channel section covered by the portion 17 of the second annulus to render them of substantially box section, to protect them against the ingress of foreign matter and to preserve, as nearly as necessary, a smooth outer perimeter of simple lines. The walls 17 and 20 thus, axially overlap for a substantial distance, not only for the above-mentioned reasons but also to provide laminated sections and welding areas.

It is contemplated that, instead of the three component elements above set forth, there may be a greater number, only two, or a single element which may be constructed from straps or discs of any suitable number that are bent, edge welded, butt welded, crimped together or otherwise suitably fabricated.

Figure 5:
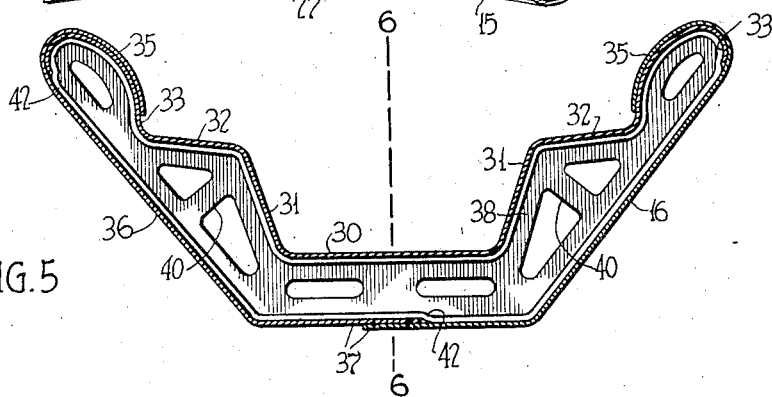
Figure 5 is a view, similar to Figures 2 and 3, showing a variation in the stiffening or truss members.
Figure 6:
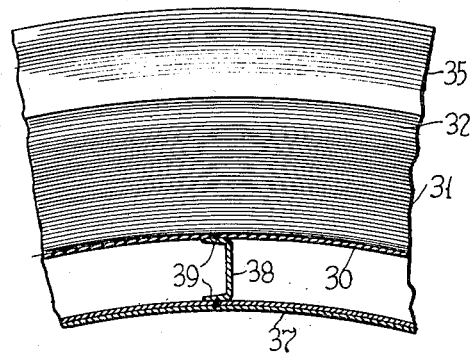
Figure 6 is a fragmentary view, taken along the line 6—6 of Figure 5.

In one aspect, a primary, but not an exclusive, element of invention, resides in the feature wherein the sheet-metal outersurface elements of the hollow-shell rim substantially form an endless loop in an axial plane of the rim, which may be of single-sheet thickness throughout, of variable single and multiple-layer thickness, and of a character wherein the inner surfaces of the loop touch at intervals, as shown in Figs. 1 to 4, inclusive, or do not touch each other, as shown in Figs. 5 and 6.

The radially-offset perimetral portions, on the wall 20, constitute interbracing means between the opposed surfaces of the walls 10 and 17, and comprise portions 22, disposed in broad-area, side-by-side relation thereto, and portions 23 bridged between the portions 22 in angular relation thereto. This broad-area, or side-by-side relation of the parts 10, 22 and 17, in conjunction with the interbracing or bridge portions 23, widely distributes the load forces and is in marked contradistinction to, and improvement over, any similar structure in which the parts, corresponding to the parts 22, are narrow edges, or touch parts, corresponding to parts 10 and 17, in point or line contact therewith.

The portions 22 are thus arranged in two rows, each extending as protruding elements with depressions therebetween, or vice versa, depending as to whether viewed radially inwardly or outwardly.

The side walls 15 subtend the angles between the walls 8 and 9, and are so related to the parts 14 and 17 at the axial ends of the walls 15, as to provide extremely rigid truss bracing. This feature is aided by the continuation of the walls 15 and 19 across the drop center portion 10, whereby welding, or attaching, of the walls 15 at positions of localized stress is avoided.

The walls 8 are suitably depressed, adjacent to the portions 14 and 18, whereby the outer surfaces of the latter merge smoothly into the outer surfaces of the former, between the portions 14 and 18, to preserve a smooth inner contour on the tire-base and flange parts.

By pinching, or bringing together, sides of the above-mentioned closed, or endless, axial loop, as indicated at positions 25, a laminated section of great strength is provided, as well as a structure or section wherein all of the layers, at these positions may be conveniently welded to each other.

It is to be noted that, even were the loop defining the axial area or contour of the rim of single-layer thickness throughout, that the above-mentioned pinching together thereof, at the points 25, would result in a laminated, or double-layer, section having similar advantages.

A salient feature of invention resides in the perimetral interlocking relation between the axial offset portions 12 and the perimetral offset segments formed by the elements 22 and 23.

As better shown in Fig. 4, the walls 22 merge, or descend radially inwardly, about easy curves 27, to positions engaging the outer surface of the wall 17 and conforming to the section contour of the channels 12 in closely fitting relation thereto. The axial and perimetral channels are therefore of closed end, or trough shaped braced at these ends, having laminated and box-section interrelation, which structure prevents concentrated stresses, widely distributes axial and radial forces, facilitates die stamping and other fabricating processes, and has other advantages.

Although certain features of the invention are adapted to rims of other types, a drop-center rim, as known in modern automobile practice presents, by reason of its complex axial contour, greater and more difficult, problems of manufacture, cost, strength and effectiveness.

For instance, it is not desirable to depart materially from the shapes which have heretofore been accepted as standards, or to depart from the smooth symmetrical contour of the tire-engaging surfaces. These features render it more difficult to simulate the standard thick-gauge rolled sheet or cast rims, in a rim made up of thin gauge sheet metal, as has been done in the present invention, the parts of which have been designed and correlated from many angles of operating and manufacturing considerations. It is one thing to provide a simple one-piece drop center rim of heavy-gauge metal, designed to withstand certain stresses in a given service, and another proposition to provide a thin-gauge sheet metal rim that, while reducing the weight, facilitating the manufacture and having other advantages over the solid rim, is the equivalent thereof in shape and strength. It would be easy to simulate the shape, without the strength, or to provide corresponding strength, without the shape, but to provide both of these features, in a rim of this character, is accomplished only by the perimetral and axial reinforcements, the perimetral interlocking feature, the truss arrangement, the hollow, or box sections, the laminated sections, the balanced and distributed stress features, and other elements set forth.

In the form of the invention set forth in Figs. 5 and 6, the axial contour of the rim is similarly of endless-loop character, consisting of a sheet or sheets of annular form disposed in axial end-to-end, or overlapping, relation to provide the flanges, tire bases and drop-center portions.

A radially-outer annulus has a drop-center wall 30, side walls 31 therefor, tire-base walls 32 and flange portions 33 which, are also return bent, as in the previously-described form.

Also, in this form, the axial-end annuli are substantially duplicates, having portions 35 about the flanges 33, side wall or truss portions 36 and overlapping inner end portions 37.

The opposed spaced walls of the axially perimetral loop are interbraced by perimetrally-spaced sheet-metal brackets of substantially channel section having web, or bridge, portions 38 between, and in angular relation to, portions 39, of substantial surface area, disposed in side-by-side engagement with the opposed inner surfaces of the rim shell. These brackets are of simple die-stamping manufacture and are preferably provided with apertures to reduce the weight thereof. In providing these apertures, the remaining portions of the brackets are shaped to provide greatest strength, in consideration of the forces involved at particular parts, as in the case of angle braces 40, in the angles between the walls 31 and 32 that are subtended by the walls 36.

Also, in the device of Figs. 5 and 6, the flanges 39 may be provided with offset portions 42 to compensate for change in layer thickness at these positions and to retain a smooth or continuous contour.

In defining the axial contour of the rims as of endless-loop character, it is not intended to place any rigid construction on the term, as that the outer annuli must, in all events, extend entirely around the rim or that there may be no local interruptions to the continuity of a loop-shape, as ordinarily understood, since slight modifications of the structure may be effected to retain substantial equivalency thereto and perhaps render it difficult to perceive a strict loop-shape.

For instance, if in Figs. 2 and 3, the wall 17 be stopped at the left end of the wall 19 or, in other words, is not overlapped therewith, the closed-loop contour would be modified to include the axially corrugated figure of the parts 22 and 23.

In Fig. 5, the ends 37 may be axially spaced and the intervening space filled by depressing the flange 39, as is done at positions 42, and other changes made within the purview of the invention.

While I have shown and described particular forms of the invention, changes may be effected therein without departing from the spirit and scope thereof, as set forth in the appended claims.

I claim as my invention:

1. A wheel rim comprising sheet-metal elements defining the axial area of the rim and having spaced inner surfaces, and annularly extending interbracing means for said surfaces including a sheet-metal element having portions disposed over substantial areas of said surfaces, respectively, and a transversely extending section bridged between said portions.

2. A wheel rim comprising thin-gauge sheet-metal elements defining the axial contour of the rim in the form of an endless loop having opposed spaced inner surfaces, and annularly extending interbracing means for said surfaces including a sheet-metal element in the loop having portions disposed over substantial areas of said surfaces, respectively, and a transversely extending portion bridged between said portions.

3. A wheel rim comprising radially inner and outer perimetral elements of sheet metal, one of which has an offset perimetral portion and the other of which has an offset axial portion co-operating with said offset perimetral portion to perimetrally interlock said elements.

4. A wheel rim comprising a sheet-metal annulus having return-bent axial end edges forming side flanges of tubular section, tire-base portions and a drop-center portion having perimetrally-spaced axial portions of channel section, and a sheet-metal annulus extending axially from one of said flanges to a radially-inner portion of the rim, having a plurality of perimetral portions of channel section disposed in perimetral interlocking relation to said perimetrally spaced axial portions.

5. A wheel rim comprising a sheet-metal annulus having return-bent axial-end edges of tubular section, forming side flanges, tire-base portions and a drop-center portion having perimetrally-spaced axial portions of channel section, embracing the sides and bottom of the drop-center portion, and a pair of sheet-metal annuli, each extending axially from a radially outer position on said first annulus, and around one of the flanges, to a radially-inner portion of the rim, in overlapping relation to the other, one of the overlapping portions having a plurality of perimetral segments of channel sections covered by the other overlapping portion and disposed in closely-fitting perimetral interlocking relation to said perimetrally-spaced axial portions.

6. A wheel rim comprising a radially-outer sheet-metal annulus having side flanges, tire-base portions and a drop-center portion, a radially-inner sheet-metal annulus axially embracing the outer annulus in spaced relation thereto between positions adjacent to the flanges, and an axial sheet-metal reinforcing web between, and substantially conforming to, adjacent inner surfaces of said inner and outer annuli.

7. A wheel rim comprising a radially-outer sheet-metal annulus having side flanges, tire-base portions and a drop-center portion, a radially-inner sheet-metal annulus axially embracing the outer annulus in spaced relation thereto between positions adjacent to the flanges, and an axial sheet-metal reinforcing web of channel section between, and substantially conforming to, adjacent inner surfaces of said inner and outer annuli.

8. A wheel rim comprising a radially outer annulus and a pair of radially inner annuli co-operating therewith and with each other to, in effect, constitute one annulus having an axial section embracing portion of the wheel-plane sides and the radially-inner perimeter of the outer annulus and transversely extending channel sections bracing portions interconnecting said annuli.

9. A wheel rim comprising a radially-outer drop-center annulus, and a pair of radially inner annuli cooperating with each other to, in effect, constitute one annulus embracing the sides and the drop center portion of the outer annulus, one of said radially inner annuli having a portion of channel section arched toward and braced against the outer annulus.

10. A wheel rim comprising a first sheet-metal annulus, and a pair of axially-extending sheet-metal annuli, each having two annular edges, one of which edges of each annulus co-operating with an annular edge of said first annulus and the other of which annular edges of both annuli co-operating with each other, one of said annuli having an annularly extending interrupted channel section reinforcing portion providing protruding elements and depressions therebetween for perimetrically interlocking a portion of the rim at said interruption, and said first annulus having complementary protruding elements and depressions to engage with said protruding elements of said one of said annuli.

11. A composite wheel rim comprising component sheet-metal elements forming a hollow section rim having offset portions forming axially extending shoulders in interlocking relation with each other against relative movement about the axis of the rim.

12. A wheel rim comprising a radially-outer sheet-metal annulus having side flanges, tire-base portions and a drop-center portion, and a radially-inner sheet-metal annulus extending axially between, and overlapping, portions of said flanges, said inner annulus providing an annularly extending reinforcing portion of interrupted double channel form providing a double row each of protruding elements and depressions therebetween interlocking portions of the rim at said interruptions, said radially-outer annulus having complementary protruding elements and depressions to engage with said protruding elements of said radially-inner annulus.

13. A light weight rim construction of the drop center type comprising drop center well, bead seats and tire retaining flanges in angular relation to each other, and a conical annulus bridging each of the apices of the angles formed on opposite sides of the rim respectively by a bead seat and the adjacent side wall of the drop center wall, the cone of which annulus is composed of elements substantially rectilinear in form, whereby the bridging constitutes a reinforcing box cross section of substantially triangular form.

14. A light weight rim construction of the drop center type comprising drop center well, bead seats and tire retaining flanges, the well sides and bead seats as well as the bead seats and retaining flanges being in angular relation to each other, and a conical annulus bridging the apex of the angle between a bead seat and the adjacent well side, the cone of said annulus being composed of elements substantially rectilinear in form, whereby the bridging constitutes a reinforcing box cross section of substantially triangular form.

CAROLUS L. EKSERGIAN.